United States Patent
Tanaka

[19]

[11] Patent Number: 5,804,770
[45] Date of Patent: Sep. 8, 1998

[54] COVER EQUIPPED ELECTRICAL CONNECTION DEVICE AND A COVER FOR AN ELECTRICAL CONNECTION DEVICE

[75] Inventor: Tsutomu Tanaka, Yokkaichi, Japan

[73] Assignee: Sumitomo Wiring Systems, Ltd.

[21] Appl. No.: 702,828

[22] Filed: Aug. 23, 1996

[30] Foreign Application Priority Data

Sep. 19, 1995 [JP] Japan ................................. 7-266259
Oct. 11, 1995 [JP] Japan ................................. 7-290457

[51] Int. Cl.⁶ ........................................... H01B 17/00
[52] U.S. Cl. ..................... 174/138 F; 429/65; 439/521
[58] Field of Search ..................... 174/188 F, 139, 174/74 A, 92, 5 R; 429/65, 121; 439/522, 521, 523, 33, 519, 901, 904, 906; D13/120

[56] References Cited

U.S. PATENT DOCUMENTS 3,956,576  5/1976  Jensen et al. ..................... 174/138 F
4,562,125  12/1985  Davis ................................. 429/65

FOREIGN PATENT DOCUMENTS 0 603 872 A2  6/1994  European Pat. Off. .
7-130353  5/1995  Japan .

*Primary Examiner*—Kristine L. Kincaid
*Assistant Examiner*—Kaman D. Cuneo
*Attorney, Agent, or Firm*—Anthony J. Casella; Gerald E. Hespos; Ludomir A. Budzyn

[57] ABSTRACT

To easily cope with a change in a distance between battery posts, a cover (5) includes a pair of cover elements (6, 7) which are provided with receptacles (8) for accommodating connection members (3) of a battery connection terminal (1), and hollow connection portions (9, 10) which are slidably fitted so as to adjust the length of the cover (5). The connection portions (9, 10) are openable, and the receptacles (8) are provided with lids (28). After the connection portions (9, 10) are opened and partly assembled, the battery connection terminal (1) is inserted into the cover (5) sideways. Then, the connection portions (9, 10) are closed. The assembly of the cover (5) and the terminal (1) is fitted such that battery posts (51) are inserted into insertion holes (4) formed in the connection members (3), and the lids (28) are closed after nuts (54) are fastened to the battery posts (51). When a distance between the battery posts (51) is changed, a corresponding battery connection terminal is prepared and the length of the cover (5) is adjusted by sliding the connection portions (9, 10) with respect to each other. Accordingly, a slight change in the distance between the posts (51) can be offset by the length adjustment of the woven wire (2) and the cover (5).

5 Claims, 7 Drawing Sheets

COVER EQUIPPED ELECTRICAL CONNECTION DEVICE AND A COVER FOR AN ELECTRICAL CONNECTION DEVICE

BACKGROUND OF THE INVENTION

1. Field of the Invention

The present invention relates to a cover equipped electrical connection device and a cover for an electrical connection terminal.

2. Description of the Prior Art

A drive power source in a prior art electric automotive vehicle is constructed by arranging a plurality of batteries and connecting battery posts standing on the batteries via battery connection terminals. A known cover equipped battery connection terminal is disclosed in Japanese Unexamined Patent Publication No. 7-130353. Such a terminal is described below with reference to FIG. 10.

This prior art terminal of FIG. 10 includes a battery connection terminal 61 and an insulating cover 62 for covering the terminal 61. The battery connection terminal 61 is constructed such that connection fittings 64 are fitted at the opposite ends of a woven wire 63, and are each formed with an insertion hole 66 into which a bolt-shaped battery post 65 is inserted. On the other hand, the cover 62 includes a bottom plate 67 on which the terminal 61 is positioned, and an upper box 68 detachably mountable on the upper surface of the bottom plate 67. Lids 69 are openably provided at the opposite ends of the upper box 68.

Specifically, the battery connection terminal 61 is accommodated in the cover 62 by being placed on the bottom plate 67 and covered by the upper box 68, and is positioned together with the cover 62 in conformity with the battery posts 65 standing on neighboring batteries 70. The posts 65 are inserted into the insertion holes 66 of the connection fittings 64 through openings 71 formed in the bottom plates 67. The connection terminal 61 is secured by fastening nuts 72 to projecting ends of the battery posts 65 while the lids 69 of the upper box 68 are opened, and then the lids 69 are closed. In this way, the posts 65 of the neighboring batteries 70 are connected by the battery connection terminal 61 covered by the cover 62.

Two battery posts 65 to be connected may not necessarily be spaced by a specified distance depending upon the arrangement of the batteries 70 or the positions of the posts 65. In the prior art terminal, if the battery connection terminal 61 is covered by the cover 62, a distance between the insertion holes 66 is fixed. Accordingly, the prior art terminal cannot be mounted if the distance between the battery posts 65 is changed.

When the batteries 70 are juxtaposed, a displacement unavoidably occurs. If the distance between the battery posts 65 changes due to such a displacement, the battery connection terminal 61 cannot be mounted. It is necessary to adjust the positions of the batteries 70 so that the battery posts 65 can be spaced by a specified distance and, therefore, a terminal mounting operations takes time.

The present invention was developed to overcome the above problem, and an object thereof is to provide a cover equipped electrical connection device and a cover for an electrical connection device which can easily cope with a change in a distance between electrical posts.

SUMMARY OF THE INVENTION

According to the invention there is provided a cover for covering an electrical connection device or terminal particularly according to the invention, in particular a battery connection device having connection members at the opposite ends of a conductor and being used to connect two spaced electrical posts, comprising: an insertion portion into which the conductor of the electrical connection terminal is insertable, and receptacles fixedly or removably provided at the opposite ends of the insertion portion for accommodating the connection members, and wherein the distance between the receptacles is adjustable.

According to a preferred embodiment, the receptacles of the cover are separately formed, and/or wherein the insertion portion is formed by slidably fitting connection portions formed with respective receptacles along a longitudinal direction.

Preferably, the length of the insertion portion is adjustable, in particular by displacing the insertion portions with respect to each other in a longitudinal direction.

Further preferably, the insertion portion comprises a tube into which the conductor is insertable, wherein in particular each receptacle is formed with a mount portion to be mounted on a corresponding end of the tube.

Still further preferably, the tube is a corrugate tube and wherein the mount portion of each cap or receptacle is formed with engaging means, comprising in particular at least one annular recess and/or projection, being engageable with the outer surface of the corrugate tube, in particular with at least one projection and/or recess thereon.

Most preferably, each receptacle is provided with at least one holding portion for holding the corresponding connection member of the electrical connection terminal in a predetermined or predeterminable position.

The invention is also directed to the use of a cover according to the invention for a cover equipped electrical connection device or terminal, in particular for an electrical connection device or terminal, having an electrical connection terminal having connection members at the opposite ends of a conductor and being capable of connecting two spaced electrical posts.

According to the invention there is further provided a cover equipped electrical connection device or terminal, in particular battery connection device having an electrical connection terminal having connection members at the opposite ends of a conductor and being capable of connecting two spaced electrical posts and further comprising a cover, in particular according to the invention, for covering the electrical connection terminal, wherein the cover comprises an insertion portion into which the conductor is insertable, and comprises receptacles fixedly or removably provided at the opposite ends of the insertion portion for accommodating the connection members, and wherein the distance between the receptacles is adjustable.

According to a preferred embodiment, the cover is openable so that the electrical connection terminal can be inserted thereinto laterally and/or longitudinally.

Preferably, at least one, in particular each receptacle of the cover is provided with an openable lid, and wherein at least one connection member can be mounted on the electrical post by opening the corresponding lid after the electrical connection terminal has been mounted in the cover.

Further preferably, the receptacles of the cover are separately formed, and/or wherein the insertion portion is formed by slidably fitting connection portions formed with respective receptacles along a longitudinal direction.

According to a further embodiment of the invention, the length of the insertion portion is adjustable for adjusting the distance of the receptacles, in particular by displacing the insertion portions with respect to each other in a longitudinal direction.

Preferably, the distance between the connecting members and/or the length of the conductor of the electrical connection terminal itself is adjustable.

According to still a further preferred embodiment of the invention, the cover comprises a tube into which the conductor is insertable and wherein each receptacle is formed in particular with a mount portion to be mounted on a corresponding end of the tube, wherein the tube is particularly a corrugate tube and/or wherein the mount portion is formed with engaging means for engaging the outer surface of the tube.

Preferably, each receptacle is provided with at least one holding portion for holding the corresponding connection member of the electrical connection terminal in a predetermined or predeterminable position.

According to a preferred embodiment of the invention there is provided a cover equipped battery connection terminal in which a battery connection terminal having connection members at the opposite ends of a conductor and being capable of connecting two spaced battery posts is provided a the cover for covering the battery connection terminal, wherein:

the length of the conductor of the battery connection terminal is adjustable, and the cover comprises an insertion portion into which the conductor is insertable and the length of which is adjustable, and receptacles provided at the opposite ends of the insertion portion for accommodating the connection members.

Accordingly, a change in the distance between the battery posts can be easily coped with by preparing a battery connection terminal having a length corresponding to the distance and changing the length of the insertion portion of the cover. Further, a slight change in the distance between the battery posts can be easily coped with by adjusting the length of the conductor of the battery connection terminal and the length of the insertion portion of the cover.

Preferably, the cover is openable so that the battery connection terminal can be inserted thereinto sideways.

Thus the battery connection terminal can be mounted into the cover sideways by opening the cover. This simplifies the mounting operation into the cover.

Further preferably, each receptacle of the cover is provided with an openable lid, and the connection members can be mounted on the battery posts by opening the lids after the battery connection terminal is mounted in the cover.

Thus the battery connection terminal can be connected with the batter posts after it is accommodated in the cover. This leads to an excellent operability.

Still further preferably, the receptacles of the cover are separately formed, and the insertion portion is formed by slidably fitting connection portions formed with respective receptacles along a longitudinal direction.

Thus the construction of the cover itself can be simplified.

According to a further preferred embodiment of the invention, there is provided a cover for covering a battery connection terminal which has connection members at the opposite ends of a conductor and is used to connect two spaced battery posts, comprising:

an insertion portion into which the conductor of the battery connection terminal is insertable and the length of which is adjustable, and receptacles provided at the opposite ends of the insertion portion for accommodating the connection members.

Accordingly, even if a change in the length of the batter connection terminal due to a change in the distance between the battery posts can be easily coped with only by changing the length of the insertion portion. Further, if the length of the conductor of the battery connection terminal is adjustable, a slight change in the distance between the battery posts can be coped with by adjusting the length of the conductor and the length of the insertion portion.

According to still a further preferred embodiment of the invention, there is provided a cover for covering a battery connection terminal which comprises a conductor and connection members at the opposite ends of the conductor and is used to connect two spaced battery posts, comprising:

a pair of caps or receptacles for accommodating the connection members of the battery connection terminal, and a tube into which the conductor is inserted, wherein each cap is formed with a mount portion to be mounted on a corresponding end of the tube.

Accordingly, a change in the length of the battery connection terminal due to a change in the distance between the battery posts can be easily coped with only by changing the length of the tube. Further, the cover can be produced at a reduced cost since the caps can be used in common, and the corrugate tube can be prepared by cutting a long corrugate tube to a desired length.

Preferably, each cap comprises an openable lid and the connection members are mounted on the battery posts by opening the lids in a state where the battery connection terminal is covered by the cover.

Thus, the battery connection terminal can be connected with the battery post after it is accommodated in the cover. Thus, an excellent operability can be ensured.

Further preferably, the tube is a corrugate tube and the mount portion of each cap is formed with annular recess and projection which are engageable with the recess and projection on the outer surface of the corrugate tube.

The corrugate tube is constructed such that circumferentially extending projections and recesses are alternately formed along the longitudinal direction on the outer and inner surfaces of a cylinder having a circular cross section, and that where the projection is formed on one of the outer and inner surfaces, the recess is formed on the other surface, and where the recess is formed on one of the outer and inner surfaces, the projection is formed on the other surface.

Accordingly, the corrugate tube adopted for the protection of a wiring harness can be used as it is. Further, a mounting construction of the caps can be obtained merely by forming, in the mount portions, annular recesses and projections to be engageable with the recesses and projections on the other surface of the corrugate tube. In other words, the mounting construction can be simplified. Therefore, the production cost can be further reduced.

Still further preferably, each cap is provided with a holding portion for holding the corresponding connection member of the battery connection terminal in a specified position.

Thus the connection members are prevented from lifting when the battery posts are inserted through the connection members of the battery connection terminal. Thus, a connection operation can be more efficiently performed.

BRIEF DESCRIPTION OF THE DRAWINGS

These and other objects, features and advantages of the present invention will become-more apparent upon a reading of the following detailed description and accompanying drawings in which.

DETAILED DESCRIPTION OF THE PREFERRED EMBODIMENT

Figure 1:
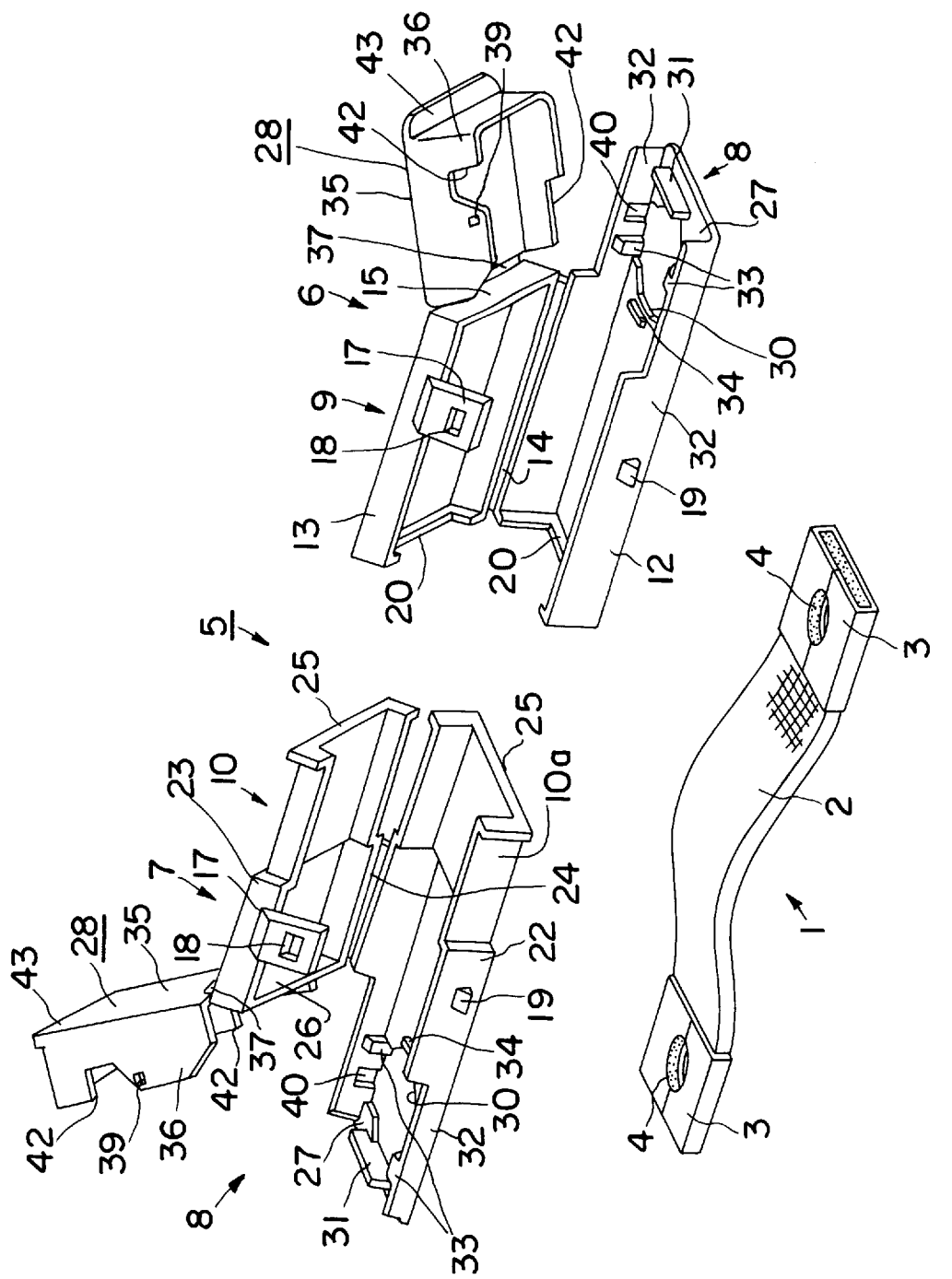
FIG. 1 is an exploded perspective view of a first embodiment according to the invention.

As shown in FIG. 1, a battery connection terminal 1 used in this embodiment includes a woven wire 2 formed into a strip-like shape by weaving a number of wires and flat connection members 3 made of a metal plate, wound around and secured to the opposite ends of the woven wire 2. Each connection member 3 is formed with an insertion hole 4 into which a bolt-shaped battery post 51 to be described later is inserted. The length of the battery connection terminal 1 is slightly adjustable by deforming the woven wire 2 so as to hold the insertion holes 4 at a specified distance from each other.

A cover 5 provided to cover the battery connection terminal 1 includes a pair of cover elements 6, 7. The cover elements 6, 7 are made of synthetic resin and particularly are substantially symmetrical.

The construction of the cover elements is described in detail. The cover elements 6, 7 includes receptacles 8, 8 for accommodating the connection members 3 of the battery connection terminal 1, and hollow connection portions 9, 10 into which the woven wire 2 is inserted, respectively.

The connection portion 9 of one cover element 6 (right side in FIG. 1) has a given rectangular cross section wherein also a substantially circular or elliptical cross section is possible, and is divided into a fixed portion 12 at a lower side and a movable portion 13 at an upper side. The movable portion 13 is pivotally and openably mounted on the fixed portion 12 via a hinge portion 14 provided at the base end of the movable portion 13 in particular along a lateral side thereof. The fixed portion 12 and the movable portion 13 are closed and locked by fitting a window 18 formed in a lock member 17 projecting from the free end of the movable portion 13 on a locking projection 19 formed on the outer surface of the fixed portion 12. In this state, the connection portion 9 is substantially in the form of a rectangular cylinder.

An end plate 15 is provided at an end face of the movable portion 13 adjacent to the receptacle 8. An inward facing jaw portion 20 is formed entirely along a connection edge of the connection portion 9 to be connected with the mating connection portion 10.

The connection portion 10 of the other cover element 7 is formed on at least a portion thereof slightly smaller than the mating connection portion 9 such that a connection end of the connection portion 10 to be connected with the connection portion 9 is slidably fitted or fittable inside the jaw portion 20 formed at the connection portion 9. The connection portion 10 is, as a whole, in the form of a rectangular cylinder formed with a stepped portion. The connection portion 10 is also divided into a fixed portion 22 at a lower side and a movable portion 23 at an upper side. The movable portion 23 is pivotal and openable with respect to the fixed portion 22 by providing a hinge portion 24 at a back or lateral side. The fixed portion 22 and the movable portion 23 are also closed and locked by fitting a window 18 formed in a lock member 17 projecting from the free end of the movable portion on a locking projection 19 formed on the outer surface of the fixed portion 22. In this state, the portions 22 and 23 form the rectangular cylinder with a stepped or recessed portion.

An end plate 26 is provided at an end face of the movable portion 23 adjacent to the receptacle 8. An outward facing jaw portion 25 is formed entirely along an edge of a stepped or recessed portion 10a of the connection portion 10.

The receptacles 8 of the cover elements 6, 7 are so formed as to be substantially mirror images or symmetric to each other. Hereafter, description is given to the receptacle 8 of the right cover element 6 and no repeated description is given to the receptacle 8 of the left cover element 7 by identifying elements by the same reference numerals.

The receptacle 8 includes a bottom portion 27 and a lid 28. The bottom portion 27 is formed continuously or unitarily or integrally with the fixed portion 12 of the connection portion 9, and its bottom wall is formed with a window 30 into which a battery post 51 and a washer 52 (see FIG. 2) are insertable.

In a position of the bottom portion 27 outside the window 30, a contact or abutting portion 31 projects. In a position of the bottom portion 27 inside the window 30, an engaging projection 34 engageable with an inner edge of the lower surface of the connection member 3 of the battery connection terminal 1 projects (see FIG. 3). Side walls 32 are formed on the receptacle 8 at the opposite sides of the bottom portion 27 along the longitudinal direction. A pair of holding projections 33 are formed on the inner surfaces of the side walls 32 at sides close to and distant from the fixed portion 12. In other words, the connection member 3 of the battery connection terminal 1 is fitted into the receptacle 8 while being held from four directions by the contact portion 31, the engaging projection 34 and the holding projections 33, and is held and accommodated in a specified position in the bottom portion 27.

The lid 28 is formed such that peripheral walls 36 are formed at three sides of a ceiling plate 35, and a side of the ceiling plate 35 where no peripheral wall 36 is formed is pivotally connected with the end plate 15 of the movable portion 13 of the connection portion 9 via a hinge portion 37. Specifically, while the connection portion 9 is closed, the lid 28 is openably fittable over the upper surface of the bottom portion 27 via the hinge portion 37. The lid 28 is closed by fitting the peripheral wall 31 opposite from the one where the hinge portion 37 is provided outside the contact portion 31 and fitting the peripheral walls 36 at the opposite sides inside the side walls 32 of the bottom portion 27. The lid 28 can be lockingly closed by engaging claws 39 formed at the peripheral walls 36 at the opposite sides with slots 40 formed in the inner surfaces of the side walls 32 of the bottom portion 27.

Notches 42 for avoiding interference with the holding projections 33 formed at the side walls 32 of the bottom portion 27 are formed at the lower edges of the peripheral walls 36 at the opposite sides of the lid 28, and an operable portion 43 used to open and close the lid 28 is formed by making the edge of the ceiling plate 35 opposite from the one where the hinge portion 37 is provided project from the corresponding peripheral wall 36.

How to use or assemble the thus constructed embodiment is described next.

Figure 2:
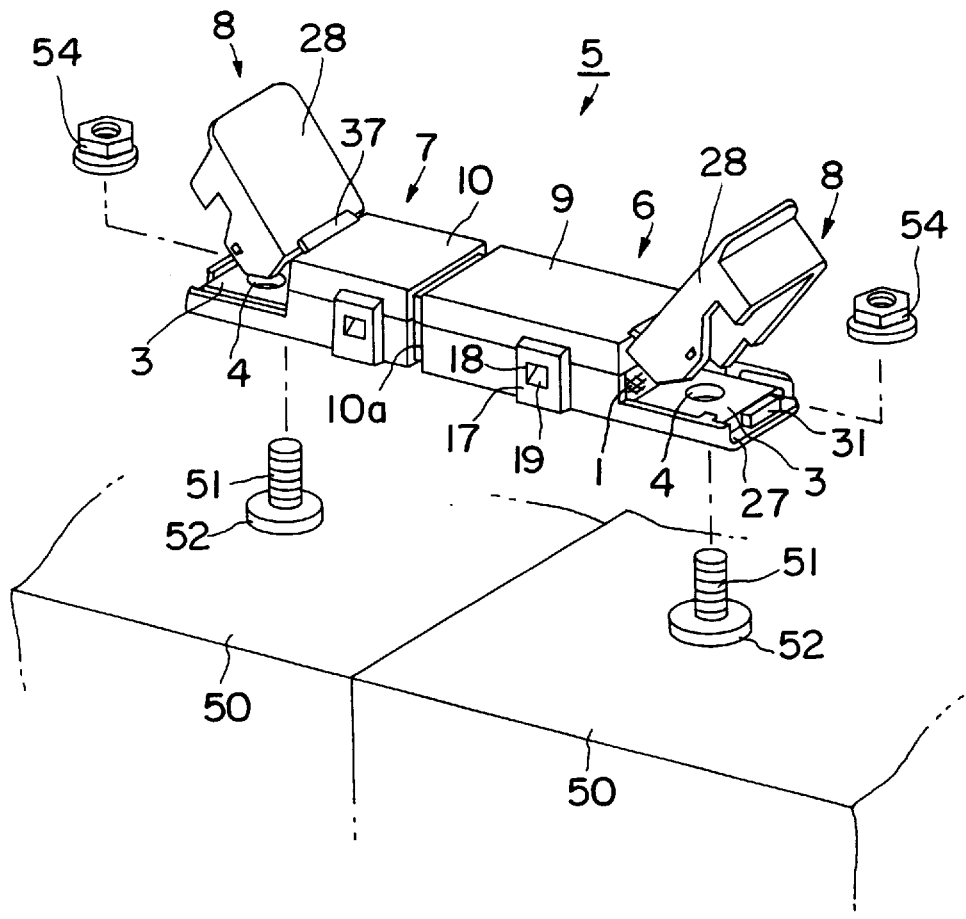
FIG. 2 is a perspective view showing a battery connection terminal assembling operation.
Figure 3:
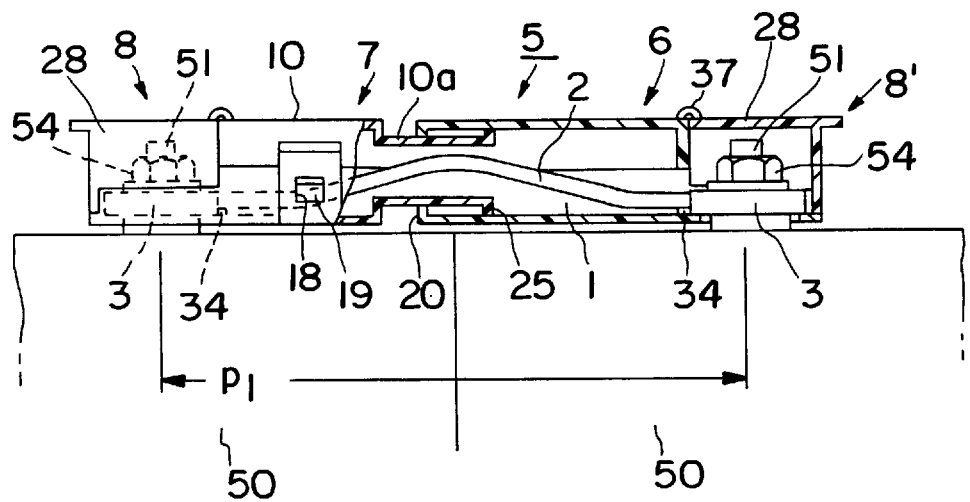
FIG. 3 is a front view after assembling.

In the case that battery posts 51 of two neighboring batteries 50 are to be connected as shown in FIGS. 2 and 3, there are prepared a battery connection terminal 1 having a length corresponding substantially to a distance p1 between the battery posts 51. The connection portions 9, 10 of the cover elements 6, 7 are opened as shown in FIG. 1, and the cover elements 6, 7 are partly assembled by fitting the stepped portion 10a of the connection portion 10 into the mating connection portion 9.

In this state, the front side of the partly assembled cover 5 is open over its entire length. The battery connection terminal 1 is fitted into the cover elements 6, 7 sideways through the opening. The connection members 3 at the opposite ends of the terminal 1 are fitted and accommodated in the bottom portions 27 of the left and right receptacles 8 in a manner as described above. During this time, the partly assembled connection portions 9, 10 slide with respect to each other to adjust the length of the cover 5 in conformity with the battery connection terminal 1.

Subsequently, the movable portions 13, 23 are rotated to close and lock the connection portions 9, 10 of the cover elements 6, 7. Then, as shown in FIG. 2, the mating connection portions 9, 10 are connected with the stepped portion 10a of the connection portion 10 fitted inside the connection portion 9. In this state, the length of the cover 5 is still adjustable. The engagement of the jaw portions 20, 25 prevents the stepped portion 10a from coming out of the connection portion 9. The lids 28 of the respective receptacles 8 are left open.

After the battery connection terminal 1 and the cover 5 are assembled as described above, the assembly is fitted, as shown in FIG. 2, such that the battery posts 51 are inserted into the corresponding insertion holes 4 of the connection members 3 of the terminal 1 through the windows 30 formed in the bottom portions 27 of the receptacles 8 of the cover elements 6, 7. At this time, if a difference between the distance between the battery posts 51 differs from the distance between the insertion holes 4, the opposite ends of the cover 5 are gripped and pulled out or pushed in, thereby adjusting the length of the cover 5. This causes the woven wire 2 of the battery connection terminal 1 to be slightly deformed, thereby adjusting the distance between the insertion holes 4 to the distance between the battery posts 51. Thereafter, the battery posts 51 are inserted into the insertion holes 4. At this time, since the connection members 3 are accommodated while being held by the holding projections 33, the contact portion 31 and the engaging projection 34, they do not lift from the bottom portions 27 of the receptacles 8. Thus, the inserting operation can be smoothly performed.

Taking advantage of the open lids 28, washer faced nuts 54 are spirally fitted with the upper ends of the battery posts 51 projecting from the upper surfaces of the connection members 3 to be fastened. Finally, the lids 28 are closed and locked, and the battery posts 51 of the neighboring batteries 50 are connected by the battery connection terminal 1 which is covered by the cover 5 as shown in FIG. 3.

Figure 4:
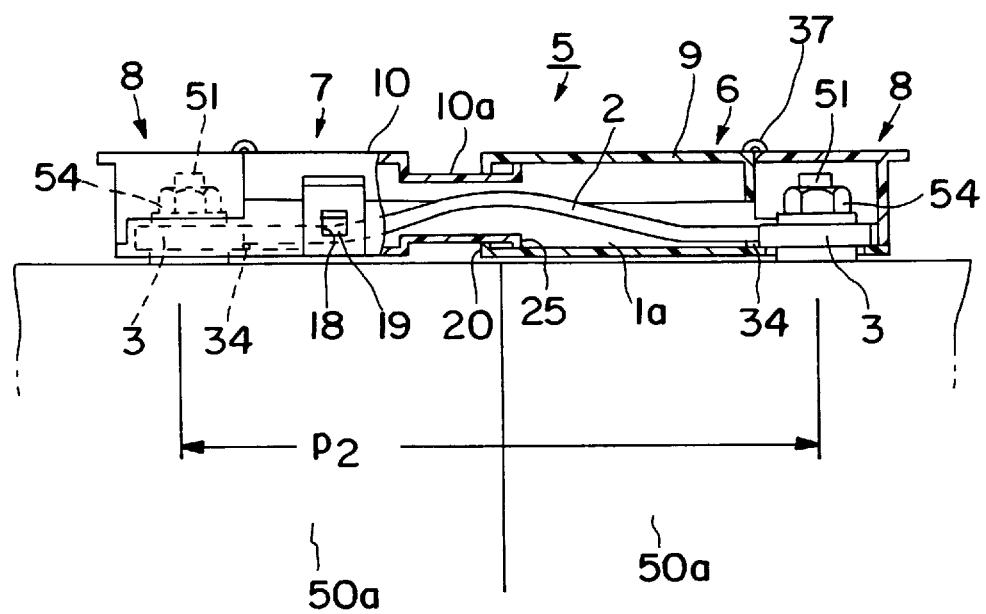
FIG. 4 is a partly missing front view of the assembly of a second embodiment of the invention when a distance between battery posts is changed.

Depending upon the type of the batteries, a distance p2 between battery posts to be connected may be longer than the distance p1 in the first embodiment as with batteries 50a shown in FIG. 4. In such a case, there are prepared a battery connection terminal 1a having a length corresponding to the distance p2. Similar to the first embodiment, the battery connection terminal 1a is inserted into the partly assembled cover elements 6, 7 sideways, and the connection members 3 are fitted and accommodated in the bottom portions 27 of the left and right receptacles 8. During this time, the partly assembled connection portions 9, 10 slide with respect to each other so as to adjust the length of the cover 5 in conformity with the battery connection terminal 1a.

Subsequently, the battery posts 51 are inserted into the insertion holes 4 of the connection members 3 after the connection portions 9, 10 of the cover elements 6, 7 are closed and locked. At this time, if the distance between the insertion holes 4 differs from the distance between the battery posts 51, the opposite ends of the cover 5 are gripped and pulled out so as to adjust the length of the cover 5 similar to the first embodiment. This causes the woven wire 2 of the battery connection terminal 1a to be slightly deformed, thereby adjusting the distance between the insertion holes 4 to the distance between the battery posts 51. Thereafter, the battery posts 51 are inserted into the insertion holes 4. Likewise, taking advantage of the open lids 28, the washer faced nuts 54 are spirally fitted with the upper ends of the battery posts 51 to be fastened. Finally, the lids 28 are closed and locked, and the battery posts 51 of the neighboring batteries 50 are connected by the battery connection terminal 1 which is covered by the cover 5 as shown in FIG. 4.

On the other hand, if a distance between battery posts to be connected is shorter than the distance p1, a battery connection terminal corresponding to this distance may be prepared and the connection portions 9, 10 of the cover 5 may be adjusted to the corresponding length. A change in the distance between the battery posts due to an arrangement of the batteries can be similarly coped with.

According to this embodiment, if the distance between the battery posts 51 to be connected is changed, a suitable battery connection terminal 1 or 1a is prepared, and the cover 5 can cope with this distance change only by sliding the connection portions 9, 10 with respect to each other to adjust the length thereof. Further, even if the distance between the battery posts 51 deviates from a specified distance, the distance between the insertion holes 4 can be adjusted to the distance between the battery posts 51 by adjusting the length of the woven wire 2 of the battery connection terminal 1 and by sliding the connection portions 9, 10 to adjust the length of the cover 5. As a result, the battery posts 51 can be inserted into the insertion holes 4. In other words, the rearrangement of the batteries is not necessary.

Since one side of the partly assembled cover elements 6, 7 is open over its entire length, the battery connection terminal 1 or 1a can be fitted sideways. Accordingly, the battery connection terminal 1 or 1a can be easily mounted in the cover 5.

Since the receptacles 8 are provided with the openable lids 28, the battery connection terminal 1 or 1a can be connected with the battery posts 51 after being accommodated in the cover 5. Further, since the connection members 3 are held in the receptacles 8 so as not to lift, an excellent assembling operability can be ensured.

The present invention is not limited to the embodiment described and shown in the drawings. The following embodiments are also embraced by a technical scope of the present invention as defined in the claims. Beside the following embodiments, a variety of changes are possible without departing from the spirit and scope of the present invention as defined in the claims. (1) Since the jaw portions 20, 25 formed at the connection portions 9, 10 act to prevent the connection portion 9 from coming out of the connection portion 10, they need not be formed entirely along the connection edges of the connection portions 9, 10, but may be formed partly therealong. (2) The receptacles of the cover may be connected by an extendible cylindrical member such as a bellows. (3) The conductor of the battery connection terminal is not limited to the woven wire shown in the foregoing embodiment, but may be another conductor the length of which is adjustable.

Figure 5:
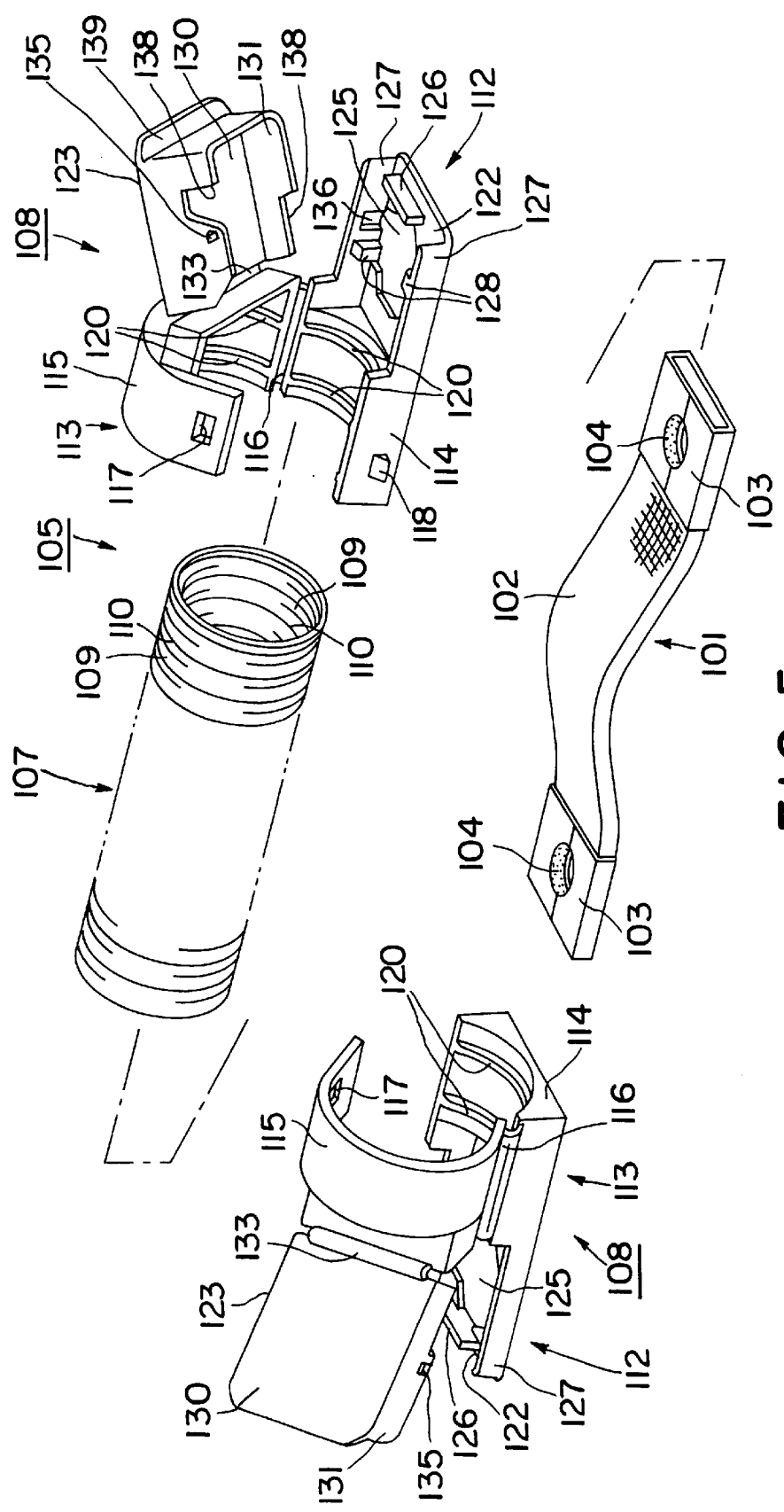
FIG. 5 is an exploded perspective view of a third embodiment according to the invention.

As shown in FIG. 5, a battery connection terminal 101 used in this embodiment includes a woven wire or tape 102 formed into a strip-like shape by weaving a number of wires and flat connection members 103 made of a metal plate, wound around and secured to the opposite ends of the woven wire 102. Each connection member 103 is formed with an insertion hole 104 into which a bolt-shaped battery post 142 to be described later is inserted. The length of the battery connection terminal 101 is adjustable by deforming the woven wire 102 so as to hold the insertion holes 104 at a specified distance from each other.

A cover 105 includes a corrugate tube 107 and a pair of caps 108. The corrugate tube 107 is made of synthetic resin, and is formed into a bellows by alternately forming circumferentially extending projections 109 and recess 110 along its longitudinal direction on the outer and inner surface of a cylinder having a circular cross section (see FIG. 7). Where the projection 109 is formed on one of the outer and inner surfaces, the recess 110 is formed on the other surface. Likewise, where the recess 110 is formed on one of the outer and inner surfaces, the projection 109 is formed on the other surface. Accordingly, the corrugate tube 107 has a suitable flexibility. There is prepared a long corrugate tube 107 which is cut to a specified length to be used. For example, the corrugate tube 107 is used to cover and protect the outer surface of the wiring harness. In this embodiment, the battery connection terminal 101 is inserted into the corrugate tube 107 so that the corrugate tube 107 covers and protects the outer surface of the battery connection terminal 101.

The pair of caps 108 are also made of synthetic resin, and have the same shape. Each cap 108 includes a receptacle 112 for accommodating the corresponding connection member 103 of the battery connection terminal 101 and a mount portion 113 for mounting the end of the corrugate tube 107.

The mount portion 113 is such that a movable portion 115 is openable with respect to a fixed portion 114 via a hinge portion 116. The portions 114, 115 have substantially semi-circular inner surfaces so that, when they are closed, the inner surfaces thereof form substantially a circular inner surface. The portions 114, 115 can be lockingly closed by fitting a window 117 formed at a free end of the movable portion 115 on a locking projection 118 projecting from the outer surface of the fixed portion 114. Further, two engaging projections 120 are formed on the inner surface of the mount portion 113, spaced apart from each other in the longitudinal direction by a specified distance. The engaging projections 120 are so formed as to have a substantially circular shape when the fixed portion 114 and the movable portion 115 are closed. By fitting the engaging projections 120 in two recesses 110 on the outer surface of the corrugate tube 107, the mount portion 113 can be mounted on the end of the corrugate tube 107 so that this end does not come out of the mount portion 113.

On the other hand, the receptacle 112 includes a bottom portion 122 and a lid 123. The bottom portion 122 is formed continuously or unitarily or integrally with the fixed portion 114 of the mount portion 113, and its bottom wall is formed with a window 125 into which a battery post 142 and a washer 143 (see FIG. 6) are insertable. A contact or abutting portion 126 projects from an edge of the bottom portion 122 opposite from its edge continuous with the fixed portion 114, and side walls 127 extending along the longitudinal direction are formed at the opposite sides of the bottom portion 122. A pair of holding projections 128 are formed on the inner surfaces of the side walls 127 at sides close to and distant from the fixed portion 114. In other words, the connection member 103 of the battery connection terminal 101 is fitted into the cap 108 while being held from three directions by the contact portion 126 and the holding projections 128, and is held and accommodated in a specified position in the bottom portion 122.

The lid 123 is formed such that peripheral walls 131 are formed at three sides of a ceiling plate 130, and a side of the ceiling plate 130 where no peripheral wall 131 is formed is pivotally connected with a side surface of the movable portion 115 of the mount portion 113 via a hinge portion 133. Specifically, while the mount portion 113 is closed, the lid 123 is openably fittable over the upper surface of the bottom portion 122 via the hinge portion 133. The lid 123 is closed by fitting the peripheral wall 131 opposite from the one where the hinge portion 133 is provided outside the contact portion 126 and fitting the peripheral walls 131 at the opposite sides inside the side walls 127 of the bottom portion 122. The lid 123 can be lockingly closed by engaging claws 135 formed at the peripheral walls 131 at the opposite sides with slots 136 formed in the inner surfaces of the side walls 127 of the bottom portion 122.

Notches 138 for avoiding interference with the holding projections 128 formed at the side walls 127 of the bottom portion 122 are formed at the lower edges of the peripheral walls 131 at the opposite sides of the lid 123, and an operable portion 139 used to open and close the lid 123 is formed by making the edge of the ceiling plate 130 opposite from the one where the hinge portion 133 is provided project from the corresponding peripheral wall 131.

How to use or assemble the thus constructed embodiment is described next.

Figure 6:
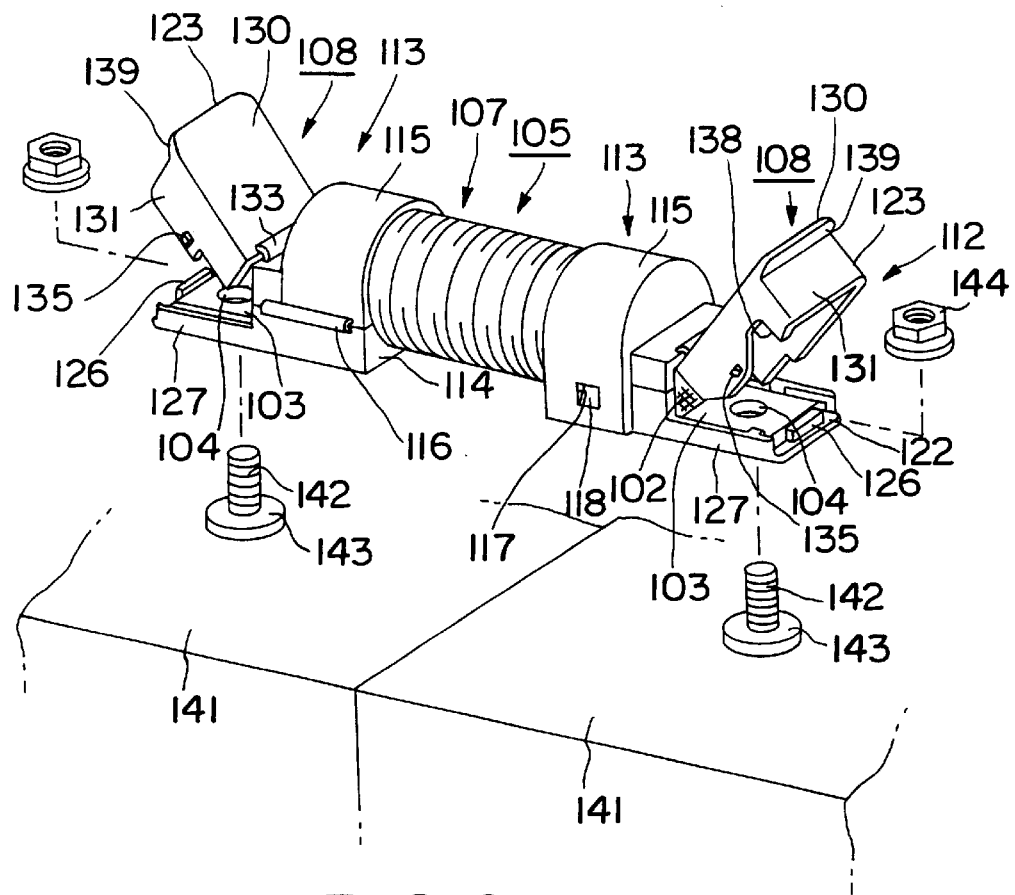
FIG. 6 is a perspective view showing a battery connection terminal assembling operation.

In the case that battery posts 142 of two neighboring batteries 141 are to be connected as shown in FIG. 6, there are prepared a battery connection terminal 101 having a length corresponding approximately to a distance between the battery posts 142, and a corrugate tube 107 cut or shortened or adjusted in length so as to correspond to the length of the battery connection terminal 101.

The battery connection terminal 101 is inserted into the corrugate tube 107 such that the connection members 103 at its opposite sides project therefrom. On the other hand, the caps 108 are left open as shown in FIG. 5, and the connection members 103 projecting from the corrugate tube 107 are fitted and accommodated in the bottom portions 122 of the receptacles 112 through the mount portions 113 in the aforementioned manner. The ends of the corrugate tube 107 are placed on the fixed portions 114 while the recesses 110 on the outer surface are engaged with the engaging projections 120.

Subsequently, when the mount portions 113 are closed and locked by rotating the movable portions 115 of the caps 108, the engaging projection 120 on the movable portion 115 are fitted in the recesses 110. Consequently, as shown in FIG. 6, the caps 108 are integrally mounted on the opposite ends of the corrugate tube 107 while accommodating the connection members 103.

After the battery connection terminal 101 and the cover 105 are assembled as described above, the assembly is moved so that the battery posts 142 are inserted into the insertion holes 104 at the connection members 103 of the battery connection terminal 101 via the windows 125 formed in the bottom portions 122 of the caps 108. At this time, since the connection members 103 are accommodated while being held by the holding projections 128 and the contact portions 126, an inserting operation can be smoothly performed without lifting the connection members 103 from the bottom portions 122 of the receptacles 112.

Figure 7:
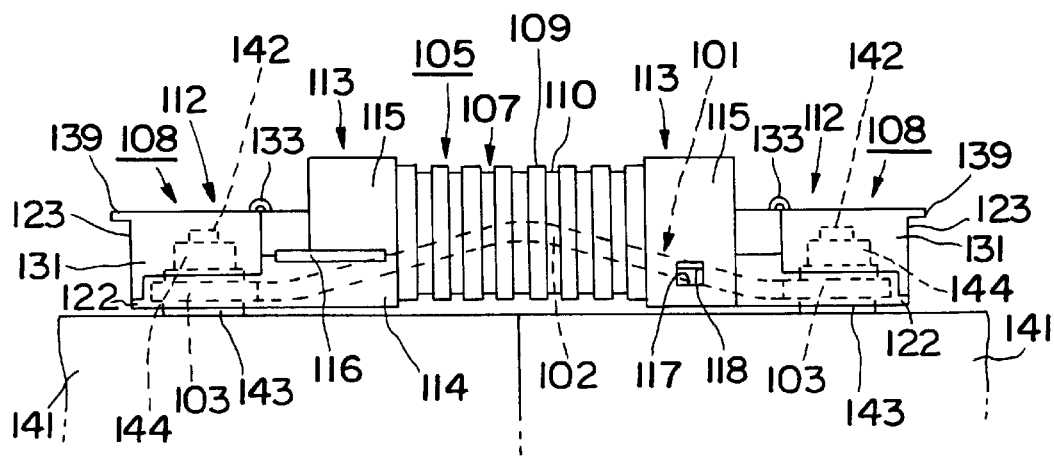
FIG. 7 is a front view after assembling.
Figure 8:
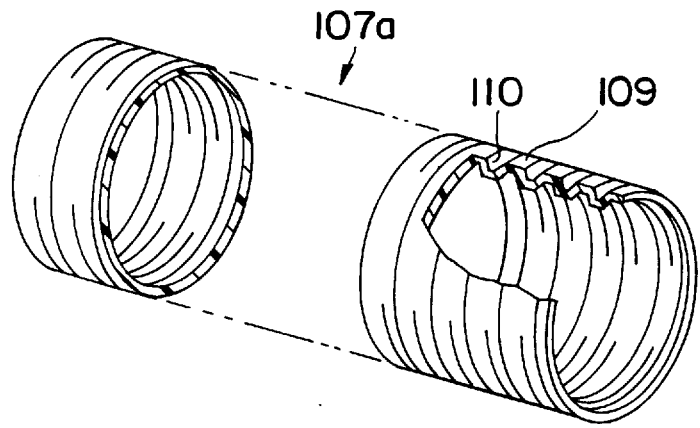
FIG. 8 is a partly missing perspective view of a corrugate tube having a different length.

Taking advantage of the open lids 123, washer faced nuts 144 are spirally or threadingly fitted with the upper ends of the battery posts 142 projecting from the upper surfaces of the connection members 103 to be fastened. Finally, the lids 123 are closed and locked, and the battery posts 142 of the neighboring batteries 141 are connected by the battery connection terminal 101 which is covered by the cover 105 as shown in FIG. 7.

Figure 9:
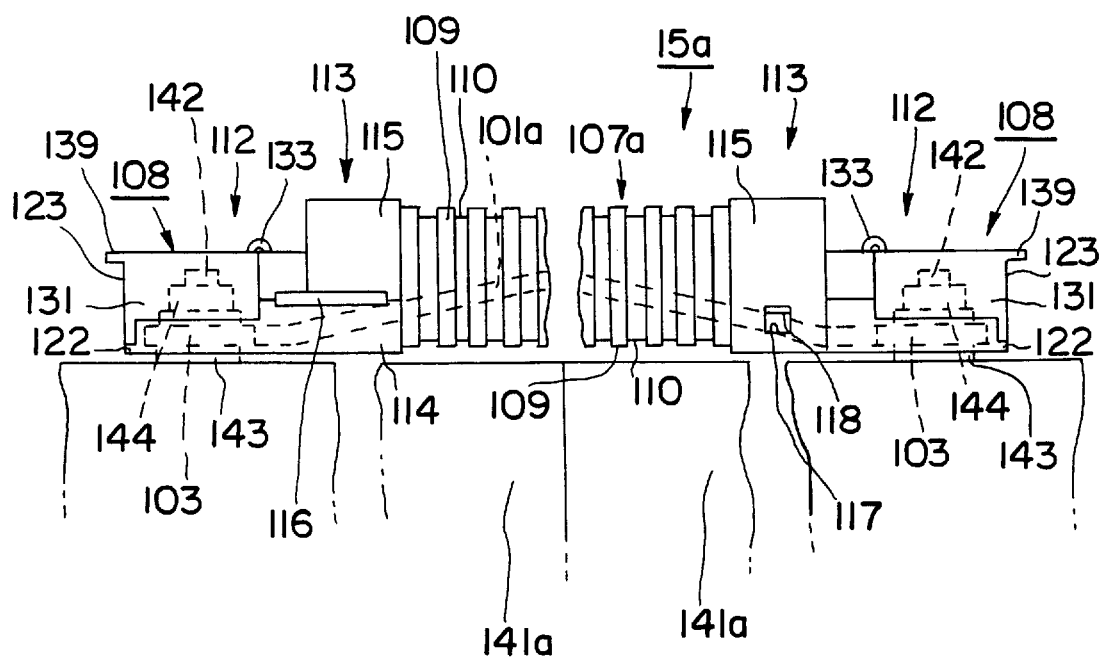
FIG. 9 is a partly missing front view of the assembly of a fourth embodiment of the invention when a distance between battery posts is changed.
Figure 10:
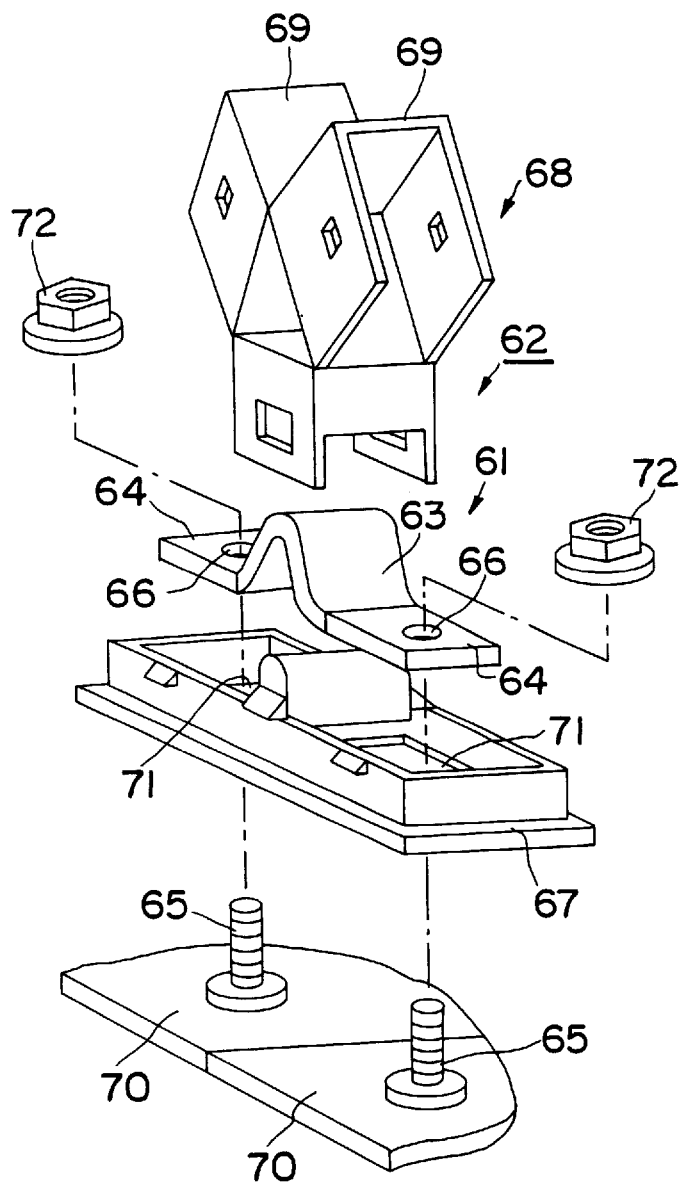
FIG. 10 is an exploded perspective view of a prior art cover.

Depending upon the type of the batteries, a distance between battery posts to be connected may be longer than the aforementioned distance as with batteries 141a shown in FIG. 9. In such a case, there are prepared a battery connection terminal 101a having a length corresponding approximately to the distance between the battery posts of the batteries 141a and a longer corrugate tube 107a cut or shortened so as to have approximately a length corresponding to that of the battery connection terminal 101a.

Using caps 108 of the same construction, the battery connection terminal 101a and the cover 105a are assembled in the same manner as described above. Thereafter, the connection members 103 of the battery connection terminal 101a are secured to the battery posts 142, and the lids 123 of the caps 108 are closed. As a result, the neighboring battery posts 142 are connected by the battery connection terminal 101a which is covered by the cover 105a as shown in FIG. 9.

More specifically, the cover 105a can easily cope with a change in the distance between the battery posts only by cutting or adjusting in length the corrugate tube 107a to a specified length. It should be noted that a change in the distance between the battery posts due to an arrangement of the batteries can be similarly coped with.

Thus, if the cover according to this embodiment is used, the change in the length of the battery connection terminals 101, 101a due to the change in the distance between the battery posts to be connected can be easily coped with only by changing the length of the corrugate tubes 107, 107a. Further, the cover can be produced at a reduced cost since the caps 108 can be used in common, and the corrugate tubes 107, 107a can be prepared by cutting a long corrugate tube to a desired length.

The caps 108 are provided with the openable lids 123 so as to allow the battery connection terminal 101 or 101a to be connected with the battery posts 142 after it is accommodated in the cover 105 or 105a, and the connection members 103 can be accommodated in the caps 108 while being so held as to prevent them from lifting. This results in an excellent assembling operability.

Further, since the corrugate tubes 107, 107a usually adopted for the protection of a wiring harness are used in connection with these embodiments as they are, there is no need to prepare a metal mold for molding the tube. Further, since the caps 108 are mounted on the corrugate tube 107 or 107a taking advantage of the recesses 110 on its outer surface, a mounting construction can be simplified. Therefore, the production cost can be further reduced.

The present invention is not limited to the embodiment described and shown in the drawings. The following embodiments are also embraced by a technical scope of the present invention as defined in the claims. Beside the following embodiments, a variety of changes are possible without departing from the spirit and scope of the present invention as defined in the claims. (1) The tube used for the cover is not limited to the corrugate tube, but may be another tube made of resin and having an insulation property. (2) The use of the cover according to the present invention is not limited to cover the battery connection terminal formed by weaving wires as shown in the foregoing embodiment, but may be widely applied to general battery connection terminals in which connection members to be secured to battery posts are formed at the opposite ends of a conductor.

What is claimed is:

1. A cover equipped electrical connection device comprising:

an electrical connection terminal (1; 1a) having connection members (3) at opposite ends of a woven deformable conductor (2) and being connectable to two spaced electrical posts (51); and a cover (5) for covering the electrical connection terminal (1; 1a), the cover (5) comprising a substantially tubular insertion portion (9, 10) into which the conductor (2) of the electrical connection terminal (1; 1a) is insertable, the insertion portion (9, 10) comprising a first insertion portion (9) and a second insertion portion (10), said second insertion portion (10) being slidably received within the first insertion portion (9), each of said first and second insertion portions (9, 10) comprising at least one fixed portion (12, 22) and at least one movable portion (13, 23) movably connected to the fixed portion (12, 22) so that said first and second insertion portions (9, 10) are openable so that the electrical connection terminal (1; 1a) can be inserted laterally, and said cover (5) further comprising receptacles (8) provided at opposite ends of the substantially tubular insertion portions (9, 10) for accommodating the connection members (3), each said receptacle (8) comprising a bottom portion (27) with a window (30) dimensioned for receiving one of said electrical posts (51) and a lid (128) movable relative to said bottom portion (27) from an open position where said connection members (3) and said electrical posts (51) are accessible to a closed position where said connection members (3) and said electrical posts (51) are substantially surrounded and enclosed and wherein slidable movement of said first and second insertion portions (9, 10) enables selective shortening of the cover (5) such that the distance between the receptacles (8) is adjustable.

2. A cover equipped electrical connection device according to claim 1, wherein the distance between the connection members (3; 103) and the length (p1; p2) of the conductor (1; 1a) of the electrical connection terminal (1; 1a; 101; 101a) are adjustable.

3. A cover equipped electrical connection device according to claim 1, wherein each of said receptacles is provided with at least one holding portion (31; 32; 33; 34; 126; 127; 128) for holding the corresponding one of said connection members (3; 103) of the electrical connection terminal (1; 1a; 101; 101a) in a predetermined position.

4. A cover for enclosing an electrical connection device (1; 1a), said device having a deformable woven conductor (2) with opposite ends, connection members (3) at the opposite ends of the deformable woven conductor (2), said electrical connection device being used to connect two spaced electrical posts (51), comprising:

first and second receptacles (8) for accommodating the connection members (3) of the electrical connection device, each said receptacle having a bottom portion (27) with a window (30) dimensioned for receiving said electrical posts (51) and a lid (28) movable relative to said bottom portion (27) from an open position, where the connection member (3) and the electrical post (51) accommodated therein are accessible, to a closed position where said connection member (3) and the electrical post (51) are securely enclosed between said bottom portion (27) and said lid (28), and a first substantially tubular insertion portion (9) having a selected length and being rigidly connected to the first receptacle (8) and a second substantially tubular insertion portion (10) having a selected length and being rigidly connected to the second receptacle (8), at least a portion of said second substantially tubular insertion portion (10) being slidably engaged within said first substantially tubular insertion portion (9) such that said first and second substantially tubular insertion portions (9, 10) define a combined length that is adjustable by displacing the first and second substantially tubular insertion portions (9, 10) with respect to each other in a longitudinal direction.

5. A cover according to claim 1, wherein each receptacle is provided with at least one holding portion (31; 32; 33; 34; 126; 127; 128) for holding the corresponding connection member (3; 103) of the electrical connection terminal (1; 1*a*; 101; 101*a*) in a predetermined position.

\* \* \* \* \*